US009411946B2

(12) United States Patent
Yu et al.

(10) Patent No.: US 9,411,946 B2
(45) Date of Patent: Aug. 9, 2016

(54) FINGERPRINT PASSWORD

(71) Applicant: Intel Corporation, Santa Clara, CA (US)

(72) Inventors: Fenghua Yu, Palo Alto, CA (US); Arjan Van De Ven, Portland, OR (US); Bruce Schlobohm, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/228,488

(22) Filed: Mar. 28, 2014

(65) Prior Publication Data

US 2015/0278495 A1 Oct. 1, 2015

(51) Int. Cl.
*H04L 29/06* (2006.01)
*G06F 21/32* (2013.01)
*H04L 9/32* (2006.01)

(52) U.S. Cl.
CPC .............. *G06F 21/32* (2013.01); *H04L 9/3231* (2013.01); *H04L 9/3239* (2013.01)

(58) Field of Classification Search
CPC .............................. G06F 21/32; H04L 9/3231
See application file for complete search history.

(56) References Cited

U.S. PATENT DOCUMENTS

| 5,719,950 | A * | 2/1998 | Osten | A61B 5/0205 340/5.82 |
| 8,611,422 | B1 * | 12/2013 | Yagnik et al. | 375/240.16 |
| 8,611,617 | B1 * | 12/2013 | Baluja | G06F 17/30247 382/124 |
| 2005/0111709 | A1 * | 5/2005 | Topping | 382/124 |
| 2007/0016777 | A1 * | 1/2007 | Henderson et al. | 713/169 |
| 2008/0209226 | A1 * | 8/2008 | Venkatesan et al. | 713/186 |
| 2013/0208942 | A1 * | 8/2013 | Davis | G06F 21/10 382/100 |
| 2014/0059675 | A1 * | 2/2014 | Batie et al. | 726/19 |
| 2014/0274364 | A1 * | 9/2014 | Caldas et al. | 463/29 |

FOREIGN PATENT DOCUMENTS

JP 2011100328 A * 5/2011

OTHER PUBLICATIONS

Teoh, Andrew BJ, Alwyn Goh, and David CL Ngo. "Random multispace quantization as an analytic mechanism for biohashing of biometric and random identity inputs." Pattern Analysis and Machine Intelligence, IEEE Transactions on 28.12 (2006): 1892-1901.*

* cited by examiner

*Primary Examiner* — Shawnchoy Rahman
(74) *Attorney, Agent, or Firm* — Schwegman Lundberg & Woessner, P.A.

(57) ABSTRACT

Various systems and methods for authenticating a user are described herein. A system to includes a biometric scanner to scan an input sequence of biometric identifiers; a storage device to store a biometric identifier database; an input module to receive the input sequence of biometric identifiers; an access module to access the biometric identifier database and retrieve a secret sequence of biometric identifiers; a comparator module to compare the input sequence of biometric identifiers to the secret sequence of biometric identifiers to obtain a result; and an authorization module to, based on the result, allow access to a resource provided by the system.

19 Claims, 3 Drawing Sheets

FINGERPRINT PASSWORD

TECHNICAL FIELD

Embodiments described herein generally relate to user authentication and in particular, to a fingerprint password.

BACKGROUND

Biometric authentication is the identification and authentication of a person using their characteristics or traits. Biometric identifiers include fingerprints, facial geometry, hand geometry, iris and retina shape, color, or size, and voice. Various sensors may be used to capture the person's characteristics or traits and match them to previously-obtained samples in order to identify or authenticate the person.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Fingerprint scanning is one mechanism for biometric authentication. However, there are known methods to crack fingerprint scanning. For example, optical scanners are unable to distinguish between a picture of a finger and the finger itself. In such a situation, an identity thief who is able to obtain a picture of a person's finger may be able to fool an optical fingerprint scanner and access private information. Capacitive fingerprint scanners may be fooled by a fake finger. In a worst case scenario, a criminal may cut off someone's finger or hand to get past a scanner-based security system.

Ultimately, the real problem with fingerprint security, or any biometric-based security system for that matter, is that once the biometric identifier is stolen, it is difficult or impossible to replace it. Thus, a person who has a fingerprint stolen may be prevented from using a fingerprint scanner for the rest of their life.

This document describes a concept of a fingerprint password. Instead of using one or even a few static fingerprints, a fingerprint password is created from a secret sequence of fingerprints. Access to a system or other secured resource is only granted when the correct sequence is presented. Although this document describes the concept primarily in the context of a sequence of fingerprints, it is understood that any biometric identifier may be used or any combination of biometric identifiers may be used. For example, a sequence of retinal scans may be used to secure a resource.

With a fingerprint password, a hacker is unable to break into a system by just using a fake print or a fake finger. Instead, the hacker will be required to present the correct fingerprints in the correct sequence. So, even if a hacker has collected all of a person's fingerprints, there may be no efficient way to break the scanning sequence and crack the system.

In other words, a fingerprint password acts as a two-factor authentication. The fingerprint is a "who you are" element and the sequence is a "what you know" element. Combining fingerprints and a scanning sequence provides both the strong security of a password and the convenience of a fingerprint scan. In another context where the biometric identifier is not a fingerprint, one may create a biometric password of "right eye," "right eye," "left eye." Combinations of eyes and fingers may be used to create a biometric-based password. The document discusses biometric passwords in general using two or more biometric identifiers in a sequence.

Figure 1:
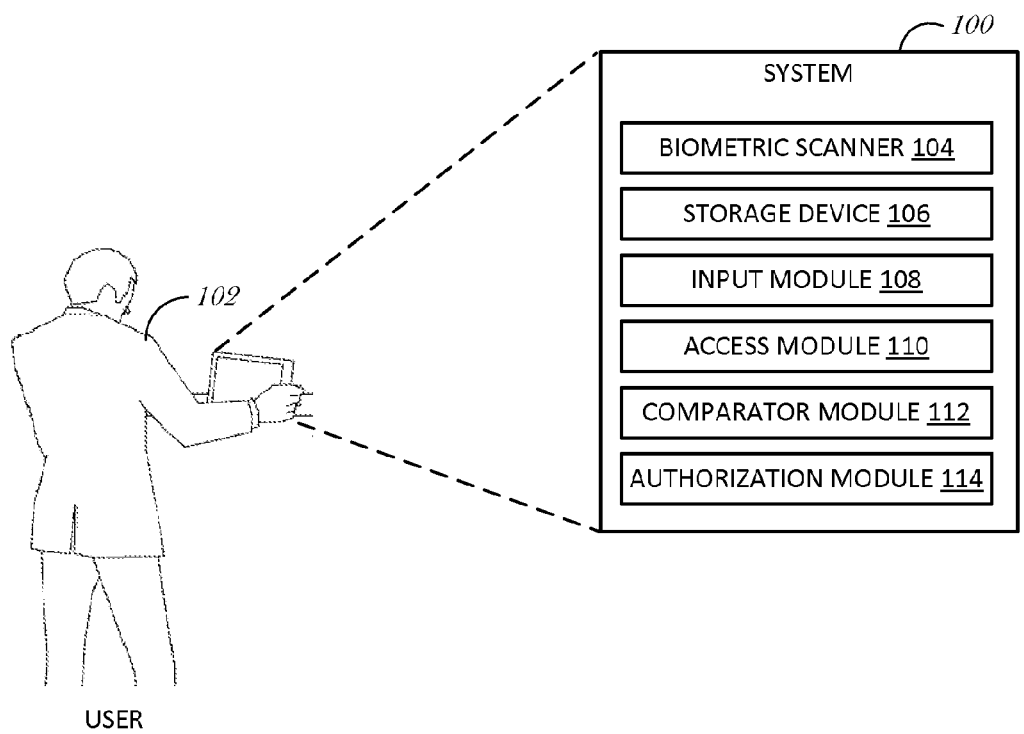
FIG. 1 is a schematic drawing illustrating a system to authenticate a user, according to an embodiment.

FIG. 1 is a schematic drawing illustrating a system 100 to authenticate a user, according to an embodiment. FIG. 1 includes a user 102, who uses the system 100 to access a resource. As discussed above, the system 100 may use one or more biometric identifiers of the user 102 in order to identify and authenticate the user 102. In the embodiment illustrated in FIG. 1, the user 102 accesses a resource secured by the system 100 by using a sequence of two or more biometric identifiers. Biometric identifiers may be fingerprints, retinal scans, pupil scans, or the like.

The system 100 may be any type of electronic or computing device, including but not limited to a smartphone, cellular telephone, mobile phone, laptop computer, tablet computer, or other networked device. The system 100 may also be an automated teller machine, a door lock system, a vehicle ignition system, or other control system to secure, lock, or restrict access to a resource.

In various embodiments, the resource may include things such as access to an online account, physical access to an area, a vehicle ignition process, elevator access, computer resource access, email access, banking account access, online banking or credit card account access, or the like.

The system 100 may include a biometric scanner 104. The biometric scanner 104 may be a fingerprint scanner, retinal scanner, etc. The biometric scanner 104 may be an optical sensor, an ultrasonic sensor, or a capacitance sensor (e.g., either passive capacitance sensor or active capacitance sensor). The system 100 may include a mechanism (e.g., software or firmware) to create a biometric password (e.g., fingerprint password). The system may also include a storage device 106 to store biometric identifier images, biometric identifier templates, user identification, retinal scans, and the like.

In operation, the user 102 may initiate a process to create a biometric password. For example, the user 102 may execute a program on the system 100 to create and store a biometric password. The program may interrogate the user 102 for a sequence of two or more biometric identifiers to store as the biometric password. Although only one user 102 is shown in FIG. 1, it is understood that two or more people may work together to form a biometric password. For example, a first person may scan their right index finger and right ring finger and then a second person may scan their right index finger. The three finger biometric password would then consist of the three biometric identifiers (or fingerprint templates) of the two people. As such, to use the biometric password, both people would have to be present and scan their fingers in the correct sequence. The program may prompt the user 102 (or users) to input the biometric password more than one time in order to verify and confirm the sequence. Further, the program may prompt the user 102 (or users) for the previously-stored biometric password in order to change the password. Other password management protocols may be used with the biometric password concept.

Conventional biometric scanners capture an image, which is called a live scan. The live scan is then digitally processed to create a biometric template. In the case of a biometric scanner 104 used to capture a fingerprint, the live scan is an image of a fingerprint and the biometric template is a fingerprint template. The biometric identifier template is a collection of extracted features from the fingerprint scan. The extracted features are then used in later fingerprint scans as a baseline for matching.

The system 100 may store the fingerprint scans (e.g., live scans) in the storage device 106. Additionally or alternatively, the system 100 may store the fingerprint templates in the storage device 106. The biometric password (e.g., sequence of fingerprints or fingerprint templates) may be stored in a hash table indexed by a checksum hash. The checksum hash may be any type of cryptographic hash and in an example embodiment, the checksum hash is MD5SUM. The checksum may be calculated by the first biometric identifier in the sequence of biometric identifiers.

When the user 102 (or users) wants to access the resource secured by the system 100, the user 102 (or users) may provide an input sequence of biometric identifiers. The system 100 uses the first scanned biometric identifier to generate a hash key and search the storage device 106 for the corresponding biometric password. If found, the biometric password is then checked against the input sequence of biometric identifiers. If there is a match, then the user 102 may access the resource. If there is not a match, then the user 102 may be notified of a verification failure. Other password management protocols may be used, such as a maximum number of tries before lockout, password reset procedures, or the like.

It is understood that any sequence of two or more fingerprints may be used, including a sequence of the same fingerprint. For example, the user 102 may create a password sequence of "right index," "right index," and "right pinky" fingers. Another user may create a password sequence of "left thumb," "left thumb." In another context where the biometric identifier is not a fingerprint, the user 102 may create a biometric password of "right eye," "right eye," "left eye." After each successful biometric scan, the password prompt may indicate that the scan was captured successfully. Such a mechanism allows the user 102 to know when to proceed and present another finger or eye for scanning (or the same finger or eye). Additionally, combinations of eyes and fingers may be used to create a biometric password, such as "right index," "right eye," "left index."

The technology may be used in an operating system to unlock or access various features. For example, in a mobile device (e.g., smartphone), the user 102 may unlock the device by tapping on the biometric scanner. This type of password mechanism may be used without a display, in which case the mobile device may conserve power by not having to power the screen during an unlock attempt. Other examples of use include an in-vehicle system to allow the user 102 to start a vehicle or unlock a feature (e.g., unlock a phonebook in the onboard system). Additionally, a biometric password may be used to secure an online resource, such as website access. A biometric scanner 104 located at the user's client computer may be used to capture the fingerprint scans and then a message may be sent to the website indicating a successful authentication. Alternatively, the website may manage the fingerprint database and fingerprint template matching.

Further, the biometric password may be used in conjunction with one or more other security protocols. For example, a biometric password may be used with an alphanumeric username, a personal identification number (PIN), or a hardware token (e.g., RFID token), to provide additional factors of security.

In an embodiment, the system 100 comprises the biometric scanner 104 to scan an input sequence of biometric identifiers; a storage device 106 to store a biometric identifier database; an input module 108 to receive the input sequence of biometric identifiers; an access module 110 to access the biometric identifier database and retrieve a secret sequence of biometric identifiers; a comparator module 112 to compare the input sequence of biometric identifiers to the secret sequence of biometric identifiers to obtain a result; and an authorization module 114 to, based on the result, allow access to a resource provided by the system 100. In an embodiment, the input sequence of biometric identifiers is obtained from a plurality of users. In another embodiment, the input sequence of biometric identifiers is obtained from a single user.

In an embodiment, to access the biometric identifier database to retrieve the secret sequence of biometric identifiers, the access module 110 is configured to identify the first biometric identifier from the input sequence of biometric identifiers; calculate a hash key based on the first biometric identifier; and use the hash key to identify the secret sequence of biometric identifiers in a hash table.

In an embodiment, the secret sequence of biometric identifiers is stored in the hash table, the hash table indexed by a checksum hash. In an embodiment, the checksum hash is calculated from the first biometric identifier in the secret sequence of biometric identifiers. In an embodiment, the checksum hash is calculated using an MD5SUM technique. In an embodiment, the secret sequence of biometric identifiers is stored as a sequence of biometric templates in the hash table. In an embodiment, the hash table is encrypted.

In a further embodiment, the input module 108 is to receive a request to create the secret sequence of biometric identifiers. The input module 108 is also configured to receive a plurality of biometric identifier scans obtained by the biometric scanner. The access module 110 may be configured to, for each biometric identifier scan in the plurality of biometric identifier scans: initiate the creation of a biometric template of the biometric identifier scan; and store the biometric template of the biometric identifier scan, preserving the order of the plurality of biometric identifier scans to form a sequence of biometric identifier scans. The biometric template of the biometric identifier scan may be created by the biometric scanner 104.

In various embodiments, the resource provided by the system includes one of: access to an online account, physical access to an area, a vehicle ignition process, elevator access, computer resource access, email access, banking account access, or credit card account access.

In an embodiment, the biometric identifier includes a fingerprint. In an embodiment, the biometric identifier includes a retinal scan. In an embodiment, the biometric identifier includes a fingerprint and a retinal scan.

Figure 2:
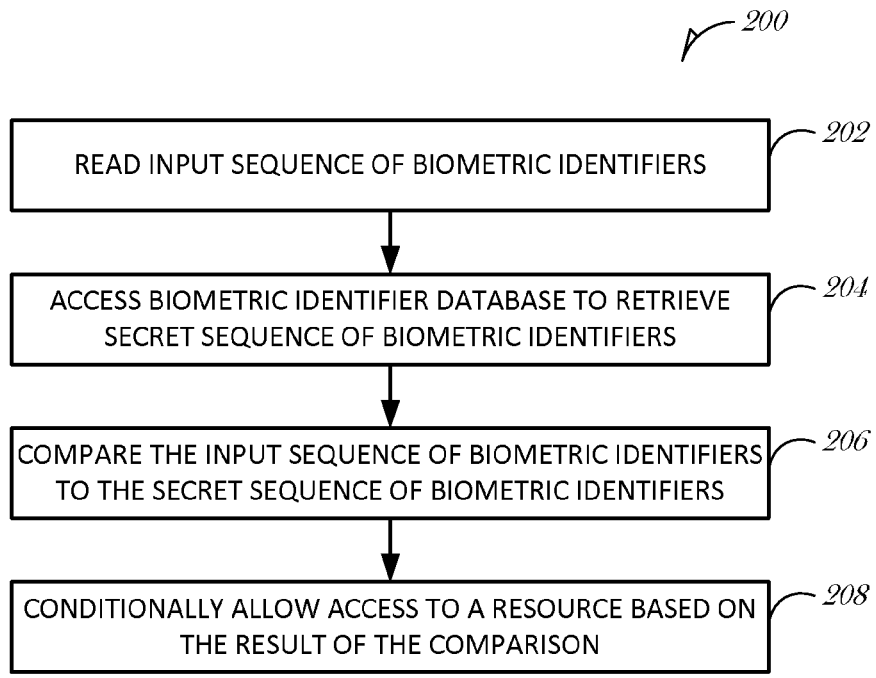
FIG. 2 is a flowchart illustrating a method for authenticating a user, according to an embodiment.

FIG. 2 is a flowchart illustrating a method 200 for authenticating a user, according to an embodiment. At 202, an input sequence of biometric identifiers is read at a biometric scanner coupled to a computing device.

At 204, a biometric identifier database is accessed to retrieve a secret sequence of biometric identifiers. In an embodiment, accessing the biometric identifier database to retrieve the secret sequence of biometric identifiers comprises: identifying the first biometric identifier from the input sequence of biometric identifiers; calculating a hash key based on the first biometric identifier; and using the hash key to identify the secret sequence of biometric identifiers in a hash table.

In an embodiment, the secret sequence of biometric identifiers is stored in the hash table, the hash table indexed by a checksum hash. In an embodiment, the checksum hash is calculated from the first biometric identifier in the secret sequence of biometric identifiers. In an embodiment, the checksum hash is calculated using an MD5SUM technique.

In an embodiment, the secret sequence of biometric identifiers is stored as a sequence of biometric templates in the hash table. In an embodiment, the hash table is encrypted.

At 206, the input sequence of biometric identifiers is compared to the secret sequence of biometric identifiers to obtain a result.

At 208, based on the result, access is allowed to a resource provided by the computing device.

In an embodiment, the input sequence of biometric identifiers is obtained from a plurality of users. In another embodiment, the input sequence of biometric identifiers is obtained from a single user.

In a further embodiment, the method 200 comprises receiving a request to create the secret sequence of biometric identifiers; receiving a plurality of biometric identifier scans; and for each biometric identifier scan in the plurality of biometric identifier scans, create a biometric template of the biometric identifier scan and store the biometric template of the biometric identifier scan, preserving the order of the plurality of biometric identifier scans to form a sequence of biometric identifier scans.

Figure 3:
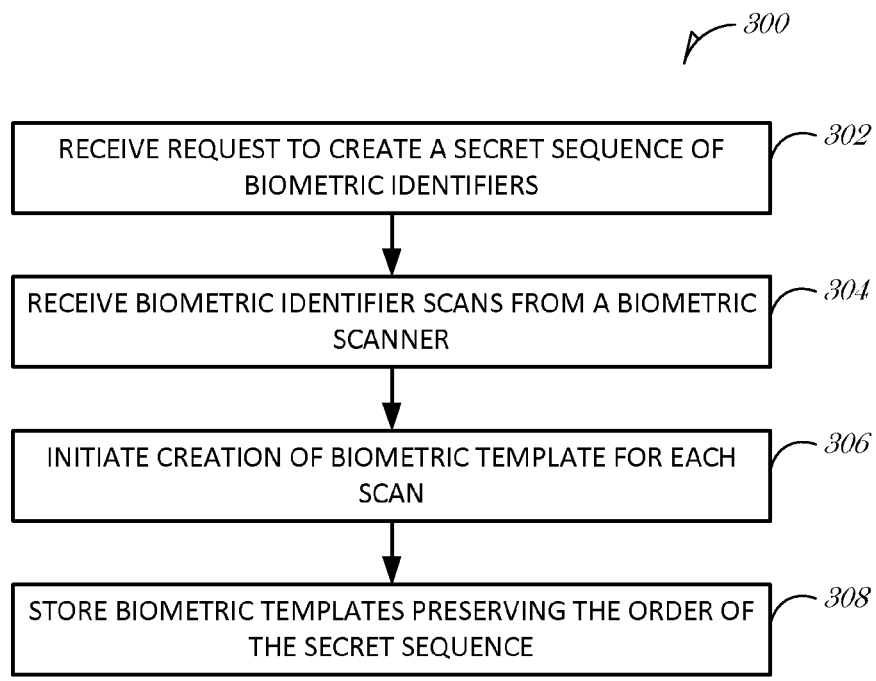
FIG. 3 is a flowchart illustrating a method for storing a biometric password, according to an embodiment.

FIG. 3 is a flowchart illustrating a method 300 for storing a biometric password, according to an embodiment. At 302, a request to create the secret sequence of biometric identifiers is received.

At 304, a plurality of biometric identifier scans are received. The biometric identifiers may be retinal scans, fingerprints, or other biometric information.

At 306, for each biometric identifier scan in the plurality of biometric identifier scans, a biometric template of the biometric identifier scan is created.

At 308, the biometric template of the biometric identifier scans are stored, preserving the order of the plurality of biometric identifier scans to form a sequence of biometric identifier scans.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
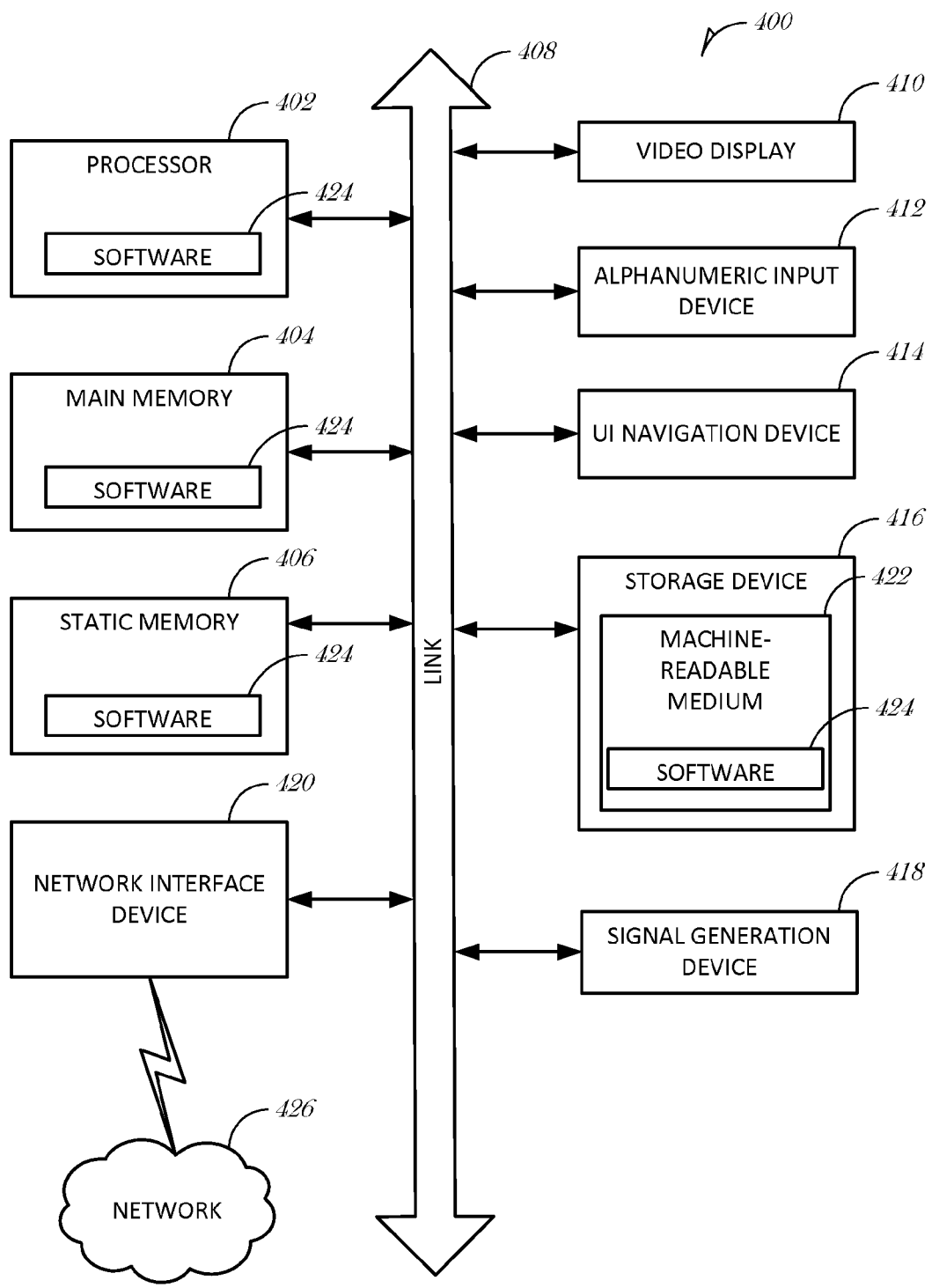
FIG. 4 is a block diagram illustrating an example machine upon which any one or more of the techniques (e.g., methodologies) discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) comprising a system to authenticate a user, the system comprising a biometric scanner to scan an input sequence of biometric identifiers; a storage device to store a biometric identifier database; an input module to receive the input sequence of biometric identifiers; an access module to access the biometric identifier database and retrieve a secret sequence of biometric identifiers; a comparator module to compare the input sequence of biometric identifiers to the secret sequence of biometric identifiers to obtain a result; and an authorization module to, based on the result, allow access to a resource provided by the system.

In Example 2, the subject matter of Example 1 may include, wherein the input sequence of biometric identifiers is obtained from a plurality of users.

In Example 3, the subject matter of any one or more of Examples 1 to 2 may include, wherein the input sequence of biometric identifiers is obtained from a single user.

In Example 4, the subject matter of any one or more of Examples 1 to 3 may include, wherein to access the biometric identifier database to retrieve the secret sequence of biometric identifiers, the access module is to: identify the first biometric identifier from the input sequence of biometric identifiers; calculate a hash key based on the first biometric identifier; and use the hash key to identify the secret sequence of biometric identifiers in a hash table.

In Example 5, the subject matter of any one or more of Examples 1 to 4 may include, wherein the secret sequence of biometric identifiers is stored in the hash table, the hash table indexed by a checksum hash.

In Example 6, the subject matter of any one or more of Examples 1 to 5 may include, wherein the checksum hash is calculated from the first biometric identifier in the secret sequence of biometric identifiers.

In Example 7, the subject matter of any one or more of Examples 1 to 6 may include, wherein the checksum hash is calculated using an MD5SUM technique.

In Example 8, the subject matter of any one or more of Examples 1 to 7 may include, wherein the secret sequence of biometric identifiers is stored as a sequence of biometric templates in the hash table.

In Example 9, the subject matter of any one or more of Examples 1 to 8 may include, wherein the hash table is encrypted.

In Example 10, the subject matter of any one or more of Examples 1 to 9 may include, wherein the input module is to receive a request to create the secret sequence of biometric identifiers; wherein the input module is to receive a plurality of biometric identifier scans obtained by the biometric scanner; and wherein the access module is to: for each biometric identifier scan in the plurality of biometric identifier scans: initiate the creation of a biometric template of the biometric identifier scan; and store the biometric template of the biometric identifier scan, preserving the order of the plurality of biometric identifier scans to form a sequence of biometric identifier scans.

In Example 11, the subject matter of any one or more of Examples 1 to 10 may include, wherein the resource provided by the system includes one of: access to an online account, physical access to an area, a vehicle ignition process, elevator access, computer resource access, email access, banking account access, or credit card account access.

In Example 12, the subject matter of any one or more of Examples 1 to 11 may include, wherein the biometric identifier includes a fingerprint.

In Example 13, the subject matter of any one or more of Examples 1 to 12 may include, wherein the biometric identifier includes a retinal scan.

In Example 14, the subject matter of any one or more of Examples 1 to 13 may include, wherein the biometric identifier includes a fingerprint and a retinal scan.

Example 11 includes subject matter for authenticating a user (such as a method, means for performing acts, machine readable medium including instructions that when performed by a machine cause the machine to performs acts, or an apparatus configured to perform) comprising: reading, at a biometric scanner coupled to a computing device, an input sequence of biometric identifiers; accessing a biometric identifier database to retrieve a secret sequence of biometric identifiers; comparing the input sequence of biometric identifiers to the secret sequence of biometric identifiers to obtain a result; and based on the result, allowing access to a resource provided by the computing device.

In Example 16, the subject matter of Example 15 may include, wherein the input sequence of biometric identifiers is obtained from a plurality of users.

In Example 17, the subject matter of any one or more of Examples 15 to 16 may include, wherein the input sequence of biometric identifiers is obtained from a single user.

In Example 18, the subject matter of any one or more of Examples 15 to 17 may include, wherein accessing the biometric identifier database to retrieve the secret sequence of biometric identifiers comprises: identifying the first biometric identifier from the input sequence of biometric identifiers; calculating a hash key based on the first biometric identifier; and using the hash key to identify the secret sequence of biometric identifiers in a hash table.

In Example 19, the subject matter of any one or more of Examples 15 to 18 may include, wherein the secret sequence of biometric identifiers is stored in the hash table, the hash table indexed by a checksum hash.

In Example 20, the subject matter of any one or more of Examples 15 to 19 may include, wherein the checksum hash is calculated from the first biometric identifier in the secret sequence of biometric identifiers.

In Example 21, the subject matter of any one or more of Examples 15 to 10 may include, wherein the checksum hash is calculated using an MDSSUM technique.

In Example 22, the subject matter of any one or more of Examples 15 to 21 may include, wherein the secret sequence of biometric identifiers is stored as a sequence of biometric templates in the hash table.

In Example 23, the subject matter of any one or more of Examples 15 to 22 may include, wherein the hash table is encrypted.

In Example 24, the subject matter of any one or more of Examples 15 to 23 may include, receiving a request to create the secret sequence of biometric identifiers; receiving a plurality of biometric identifier scans; and for each biometric identifier scan in the plurality of biometric identifier scans: create a biometric template of the biometric identifier scan; and store the biometric template of the biometric identifier scan, preserving the order of the plurality of biometric identifier scans to form a sequence of biometric identifier scans.

In Example 25, the subject matter of any one or more of Examples 15 to 24 may include, wherein the resource provided by the system includes one of: access to an online account, physical access to an area, a vehicle ignition process, elevator access, computer resource access, email access, banking account access, or credit card account access.

In Example 26, the subject matter of any one or more of Examples 15 to 25 may include, wherein the biometric identifier includes a fingerprint.

In Example 27, the subject matter of any one or more of Examples 15 to 26 may include, wherein the biometric identifier includes a retinal scan.

In Example 28, the subject matter of any one or more of Examples 15 to 27 may include, wherein the biometric identifier includes a fingerprint and a retinal scan.

Example 29 includes a machine-readable medium including instructions for authenticating a user, which when executed by a machine, cause the machine to perform operations of any of the Examples 15-28.

Example 30 includes an apparatus comprising means for performing any of the Examples 15-28.

Example 31 includes an apparatus comprising: means for reading, at a biometric scanner coupled to a computing device, an input sequence of biometric identifiers; means for accessing a biometric identifier database to retrieve a secret sequence of biometric identifiers; means for comparing the input sequence of biometric identifiers to the secret sequence of biometric identifiers to obtain a result; and means for based on the result, allowing access to a resource provided by the computing device.

In Example 32, the subject matter of Example 31 may include, wherein the input sequence of biometric identifiers is obtained from a plurality of users.

In Example 33, the subject matter of any one or more of Examples 31 to 32 may include, wherein the input sequence of biometric identifiers is obtained from a single user.

In Example 34, the subject matter of any one or more of Examples 31 to 33 may include, wherein the means for accessing the biometric identifier database to retrieve the secret sequence of biometric identifiers comprises: means for identifying the first biometric identifier from the input sequence of biometric identifiers; means for calculating a hash key based on the first biometric identifier; and means for using the hash key to identify the secret sequence of biometric identifiers in a hash table.

In Example 35, the subject matter of any one or more of Examples 31 to 34 may include, wherein the secret sequence of biometric identifiers is stored in the hash table, the hash table indexed by a checksum hash.

In Example 36, the subject matter of any one or more of Examples 31 to 35 may include, wherein the checksum hash is calculated from the first biometric identifier in the secret sequence of biometric identifiers.

In Example 37, the subject matter of any one or more of Examples 31 to 36 may include, wherein the checksum hash is calculated using an MDSSUM technique.

In Example 38, the subject matter of any one or more of Examples 31 to 37 may include, wherein the secret sequence of biometric identifiers is stored as a sequence of biometric templates in the hash table.

In Example 39, the subject matter of any one or more of Examples 31 to 38 may include, wherein the hash table is encrypted.

In Example 40, the subject matter of any one or more of Examples 31 to 39 may include, means for receiving a request to create the secret sequence of biometric identifiers; means for receiving a plurality of biometric identifier scans; and for each biometric identifier scan in the plurality of biometric identifier scans: means for create a biometric template of the biometric identifier scan; and means for store the biometric template of the biometric identifier scan, preserving the order of the plurality of biometric identifier scans to form a sequence of biometric identifier scans.

In Example 41, the subject matter of any one or more of Examples 31 to 40 may include, wherein the resource provided by the system includes one of: access to an online account, physical access to an area, a vehicle ignition process, elevator access, computer resource access, email access, banking account access, or credit card account access.

In Example 42, the subject matter of any one or more of Examples 31 to 41 may include, wherein the biometric identifier includes a fingerprint.

In Example 43, the subject matter of any one or more of Examples 31 to 42 may include, wherein the biometric identifier includes a retinal scan.

In Example 44, the subject matter of any one or more of Examples 31 to 43 may include, wherein the biometric identifier includes a fingerprint and a retinal scan.

Example 45 includes subject matter (such as a method, means for performing acts, machine readable medium including instructions that when performed by a machine cause the machine to performs acts, or an apparatus configured to perform) comprising: receiving a request to create a secret sequence of biometric identifiers; receiving a plurality of biometric identifier scans; and for each biometric identifier scan in the plurality of biometric identifier scans: creating a biometric template of the biometric identifier scan; and storing the biometric template of the biometric identifier scan, preserving the order of the plurality of biometric identifier scans to form a sequence of biometric identifier scans.

Example 46 includes a machine-readable medium including instructions, which when executed by a machine, cause the machine to the operations comprising: receiving a request to create a secret sequence of biometric identifiers; receiving a plurality of biometric identifier scans; and for each biometric identifier scan in the plurality of biometric identifier scans: creating a biometric template of the biometric identifier scan; and storing the biometric template of the biometric identifier scan, preserving the order of the plurality of biometric identifier scans to form a sequence of biometric identifier scans.

Example 47 includes subject matter (such as a device, apparatus, or machine) comprising an input module to receive a request to create a secret sequence of biometric identifiers; a biometric scanner to scan biometric identifiers; an input module to receive a plurality of biometric identifier scans; an access module to: for each biometric identifier scan in the plurality of biometric identifier scans: create a biometric template of the biometric identifier scan; and store the biometric template of the biometric identifier scan, preserving the order of the plurality of biometric identifier scans to form a sequence of biometric identifier scans.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for authenticating a user, the system comprising:
   a biometric scanner to scan an input sequence of biometric identifiers, the input sequence including a first biometric identifier that is followed by at least one subsequent biometric identifier in a particular order;
   a storage device to store a biometric identifier database;
   an input circuit to receive the input sequence of biometric identifiers;
   an access circuit to access the biometric identifier database and retrieve a predefined secret sequence of biometric identifiers, wherein the access circuit is to:
      detect the first biometric identifier received via the biometric scanner and the input circuit; and
      retrieve the secret sequence of biometric identifiers based on detection of only the first biometric identifier;
   a comparator circuit to compare the input sequence of biometric identifiers to the secret sequence of biometric identifiers to obtain a result; and
   an authorization circuit to, based on the result, allow access to a resource provided by the system.

2. The system of claim 1, wherein to access the biometric identifier database to retrieve the secret sequence of biometric identifiers, the access circuit is to:
   calculate a hash key based on the first biometric identifier; and
   use the hash key to retrieve the secret sequence of biometric identifiers in a hash table.

3. The system of claim 2, wherein the secret sequence of biometric identifiers is stored in the hash table, the hash table indexed by a checksum hash.

4. The system of claim 3, wherein the checksum hash is calculated from the first biometric identifier in the secret sequence of biometric identifiers.

5. The system of claim 4, wherein the checksum hash is calculated using an MD5 SUM technique.

6. The system of claim 3, wherein the secret sequence of biometric identifiers is stored as a sequence of biometric templates in the hash table.

7. The system of claim 2, wherein the hash table is encrypted.

8. The system of claim 1,
   wherein the input circuit is to receive a request to create the secret sequence of biometric identifiers;

wherein the input circuit is to receive a plurality of biometric identifier scans obtained by the biometric scanner; and wherein the access circuit is to:
for each biometric identifier scan in the plurality of biometric identifier scans:
initiate the creation of a biometric template of the biometric identifier scan; and
store the biometric template of the biometric identifier scan, preserving the order of the plurality of biometric identifier scans to form a sequence of biometric identifier scans.

9. The system of claim 1, wherein the resource provided by the system includes one of: access to an online account, physical access to an area, a vehicle ignition process, elevator access, computer resource access, email access, banking account access, or credit card account access.

10. The system of claim 1, wherein the biometric identifier includes a fingerprint.

11. The system of claim 1, wherein the biometric identifier includes a retinal scan.

12. The system of claim 1, wherein the biometric identifier includes a fingerprint and a retinal scan.

13. A non-transitory machine-readable medium including instructions for authenticating a user, which when executed by a machine, cause the machine to perform operations comprising:
reading, at a biometric scanner coupled to a computing device, an input sequence of biometric identifiers, the input sequence including a first biometric identifier that is followed by at least one subsequent biometric identifier in a particular order;
accessing a biometric identifier database to retrieve a predefined secret sequence of biometric identifiers, including:
detecting the first biometric identifier received via the biometric scanner and the input circuit; and
retrieving the secret sequence of biometric identifiers based on detection of only the first biometric identifier;
comparing the input sequence of biometric identifiers to the secret sequence of biometric identifiers to obtain a result; and
based on the result, allowing access to a resource provided by the computing device.

14. The machine-readable medium of claim 13, wherein accessing the biometric identifier database to retrieve the secret sequence of biometric identifiers comprises:
calculating a hash key based on the first biometric identifier; and
using the hash key to retrieve the secret sequence of biometric identifiers in a hash table.

15. The machine-readable medium of claim 14, wherein the secret sequence of biometric identifiers is stored in the hash table, the hash table indexed by a checksum hash.

16. The machine-readable medium of claim 15, wherein the checksum hash is calculated from the first biometric identifier in the secret sequence of biometric identifiers.

17. A method for authenticating a user, the method comprising:
reading, at a biometric scanner coupled to a computing device, an input sequence of biometric identifiers, the input sequence including a first biometric identifier that is followed by at least one subsequent biometric identifier in a particular order;
accessing a biometric identifier database to retrieve a predefined secret sequence of biometric identifiers, including:
detecting the first biometric identifier received via the biometric scanner and the input circuit; and
retrieving the secret sequence of biometric identifiers based on detection of only the first biometric identifier;
comparing the input sequence of biometric identifiers to the secret sequence of biometric identifiers to obtain a result; and
based on the result, allowing access to a resource provided by the computing device.

18. The method of claim 17, wherein accessing the biometric identifier database to retrieve the secret sequence of biometric identifiers comprises:
calculating a hash key based on the first biometric identifier; and
using the hash key to retrieve the secret sequence of biometric identifiers in a hash table.

19. The method of claim 18, wherein the secret sequence of biometric identifiers is stored in the hash table, the hash table indexed by a checksum hash.

* * * * *